Oct. 14, 1952     T. ULRICH     2,613,985
VEHICLE BODY COWL CONSTRUCTION
Filed Sept. 6, 1949
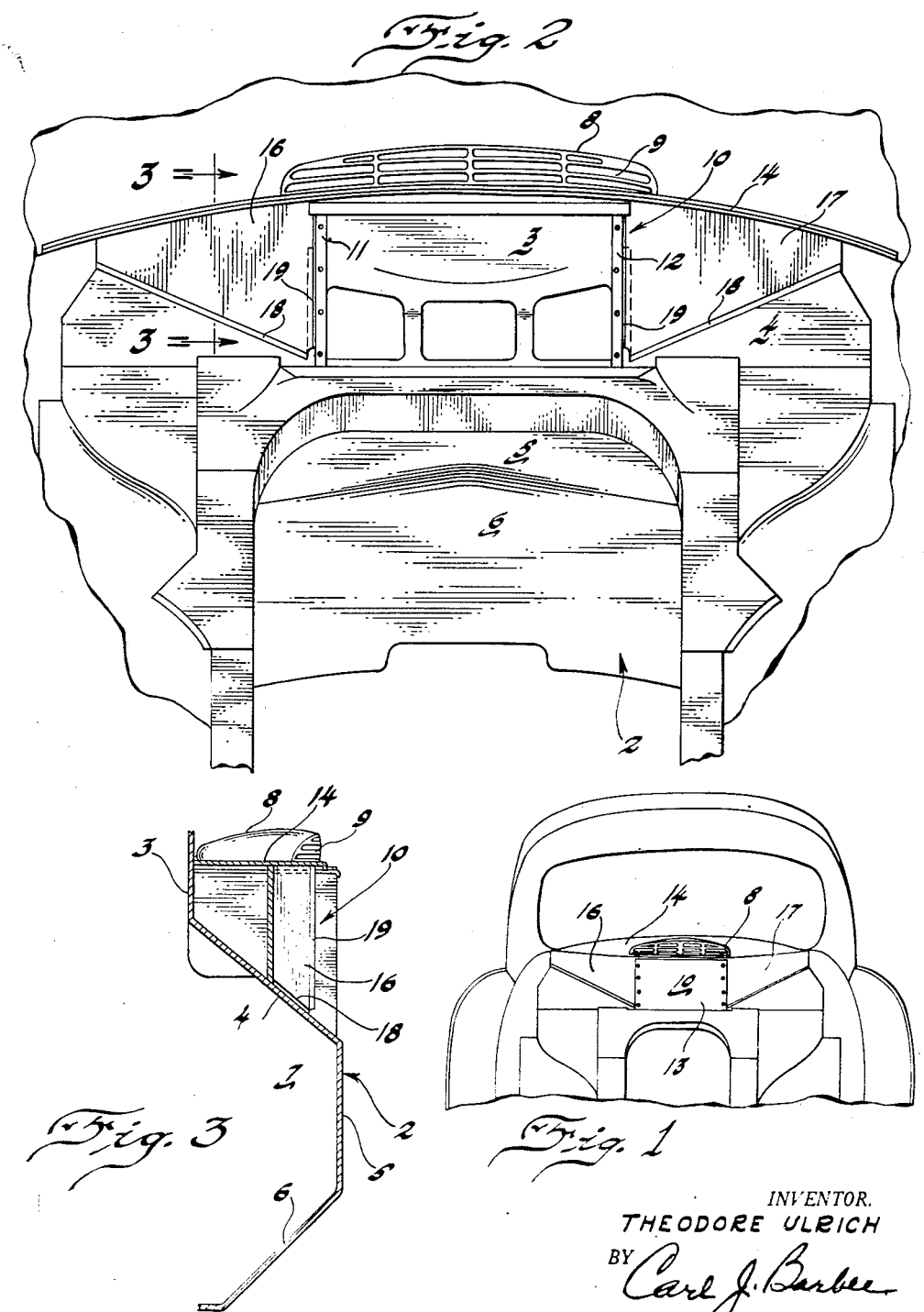
INVENTOR.
THEODORE ULRICH
BY Carl J. Barbee
HIS ATTORNEY Patented Oct. 14, 1952

2,613,985

UNITED STATES PATENT OFFICE 2,613,985

VEHICLE BODY COWL CONSTRUCTION

Theodore Ulrich, Detroit, Mich., assignor to Nash-Kelvinator Corporation, Kenosha, Wis., a corporation of Maryland Application September 6, 1949, Serial No. 114,123

5 Claims. (Cl. 296—28)

The invention relates to vehicle bodies and has particular reference to the arrangement of structural members at the forward end of the vehicle whereby a rigid supporting structure is obtained which incorporates useful ancillary objectives.

The principal object of the invention is to provide an arrangement of structural members which will lend the necessary rigidity to that section of the vehicle which is immediately adjacent the rear end of the vehicle engine and at the same time provide a necessary hopper construction useful in connection with the air conditioning system of the vehicle. The arrangement of the structural members additionally serves to provide desirable leg room within the vehicle between the front seat and the dash panel.

Other objects and advantages of the invention will become apparent upon reading the following specification and upon examination of the drawings in which:

Figure 1 is a front perspective view taken from about a 30° angle of automotive vehicle disclosing the invented subject matter;

Figure 2 is an enlarged fragmentary front head on view of the same vehicle; and

Figure 3 is a partial sectional view taken on line 3—3 of Figure 2.

In the preferred embodiment of the invention I have shown an automotive vehicle in Figure 1 which generally discloses the subject matter of the invention. The principal structural member which separates the interior of the automotive vehicle from the engine compartment consists of a large irregularly-shaped panel member 2, which is commonly referred to as being a dash panel. The configuration of the dash panel 2 is shown to some extent in Figure 2 as well as in Figure 3. It will be noted that the dash panel 2 includes a substantially vertically extending portion 3 which merges with an angularly downwardly depending portion 4, which in turn merges with a second substantially vertically extending portion 5, which in turn merges with an angularly inclined portion 6, thereby providing a recessed area indicated at 7 on the vehicle interior side of the dash panel. This recessed area 7 provides adequate leg room for the front seat passengers.

With the development of the type of air conditioning systems for automotive vehicles wherein fresh air from outside the vehicle is permitted to enter the interior of the vehicle via some exterior opening in the vehicle such as an air intake housing 8, it is necessary to provide means for disposing of the foreign elements which may be present in the atmosphere. Particularly on a rainy day it is necessary to provide means for disposal of rain water which enters the air intake opening 9 at the front of housing 8. Heretofore it has been common practice to suspend a hopper unit from the dash panel somewhere within the interior of the vehicle. By providing a dash panel having the configuration as shown in Figure 3, which incorporates the substantially vertical portion 3 and the angularly inclined downward and outward portion 4, I have provided a novel shelf-like construction for accommodating the hopper assembly 10. The walls 3 and 4 of the dash panel 2 form the rear and bottom walls of the hopper assembly. To complete the hopper assembly I have provided end walls 11 and 12 which consists of stamping formed to the configuration defined by dash panel walls 3 and 4. A removable cover 13, shown in Figure 1, completes the front wall of the hopper assembly and provides means for having access to the interior of the hopper for repair or replacement of the parts of the air conditioning system which are mounted within the hopper.

A ledge or cowl 14 which spans the vehicle crosswise and which accommodates air intake housing 8 is supported in its central region by the hopper assembly 10 and is additionally supported throughout the remainder of its span by the wing members 16 and 17. The wing members 16 and 17 are formed as stampings having peripheral flanges 18 and 19. The flanges 18 are flat against dash panel portion 4 and may be welded thereto. Flanges 19 are flat against the end walls 11 and 12 of the hopper assembly and may be welded thereto. The upper peripheral edges of wings 16 and 17 may be welded directly to ledge 14 thereby providing a composite unified structure which in addition to serving as a hopper unit provides the necessary supporting walls for the cross ledge 14.

Thus it can be seen that I have provided a novel structural arrangement wherein a substantial portion of the air conditioning system is mounted on the engine compartment side of the dash panel, thereby affording additional leg room in the vehicle interior and additionally providing the necessary supporting structure for the cross ledge 14 of the vehicle.

Having thus described my invention, what I claim is:

1. A body construction for an automotive vehicle comprising a panel member forming a partition wall between the interior of the vehicle and the engine compartment of the vehicle, said panel member extending from one side of the vehicle across to the opposite side, a section of said panel near the upper end thereof being inclined upwardly and inwardly toward the vehicle interior, and a further section of said panel continuing substantially vertically upwardly from the inclined section, a box-like member secured to the panel on the engine compartment side approximately centrally of the panel member with respect to opposite sides of the automotive vehicle, the overall length of said box-like member being less than one-half of the length of the panel member measured from opposite sides of the vehicle, and said box-like member having as part of its walls a portion of the inclined and the substantially vertical sections of the panel, a pair of supporting wings secured on opposite sides of the box-like member, each wing extending outwardly from the box-like member, a roof panel member bridging the wings and the box-like member, said wings having their lower longitudinal edges secured to the panel and their upper longitudinal edges secured to the roof panel member and serving as supporting walls for the roof panel member.

2. A body construction for an automotive vehicle comprising a panel member forming a partition wall between the interior of the vehicle and the engine compartment of the vehicle, said panel member extending from one side of the vehicle across to the opposite side, a section of said panel near the upper end thereof being inclined upwardly and inwardly toward the vehicle interior, and a further section of said panel continuing substantially vertically upwardly from the inclined section, a box-like member secured to the panel on the engine compartment side approximately centrally of the panel member with respect to opposite sides of the automotive vehicle, the overall length of said box-like member being less than one-half of the length of the panel member measured from opposite sides of the vehicle, and said box-like member having as part of its walls a portion of the inclined and the substantially vertical sections of the panel, a pair of supporting wings secured on opposite sides of the box-like member, each wing extending outwardly from the box-like member, a roof panel member extending crosswise of the panel above the box-like member and above the wings, said box-like member and said wings serving as support members for the roof panel member.

3. A body construction for an automotive vehicle comprising a panel member forming a partition wall between the interior of the vehicle and the engine compartment of the vehicle, a section of said panel near the upper end thereof being inclined upwardly and inwardly toward the vehicle interior, and a further section of said panel continuing substantially vertically upwardly from the inclined section, a box-like member secured to the panel on the engine compartment side and having as part of its walls the inclined and the substantially vertical sections of the panel, said box-like member also having opposed side walls, each with two edges conforming to the contour of the inclined and substantially vertical sections of the panel member, a pair of supporting wings each with one edge abutting the side walls of the box-like member and extending outwardly away from the box-like member toward opposite sides of the vehicle, a roof panel member mounted above the box-like member and the wings and being secured thereto, whereby the box-like member and the wings serve as support members for the roof panel member.

4. A body construction for an automotive vehicle comprising a panel member forming a partition wall between the interior of the vehicle and the engine compartment of the vehicle, a portion of the panel member having a wall bent to provide one face defining an obtuse angle with respect to a second face, a box-like structure nestled in the juncture of said faces, the panel member serving as a wall of the box-like structure, additional walls of the box-like structure having edges conformed to the obtuse angle of the panel member, the box-like structure having an opening exposed to the engine compartment side of the panel member, and a removable cover closing said opening.

5. A body construction for an automotive vehicle comprising a panel member forming a partition wall between the interior of the vehicle and the engine compartment of the vehicle, a portion of the panel member having a wall bent to provide one face defining an obtuse angle with respect to a second face, a box-like structure nestled in the juncture of said faces, the panel member serving as a wall of the box-like structure, additional walls of the box-like structure having edges conformed to the obtuse angle of the panel member, a roof panel member mounted over the box-like structure and receiving support therefrom, wing members mounted exteriorly of the box-like structure and interposed between one face of the panel member and the roof panel member providing additional support for the roof panel member.

THEODORE ULRICH.

REFERENCES CITED

The following references are of record in the file of this patent:

UNITED STATES PATENTS

| Number | Name | Date |
| --- | --- | --- |
| 1,371,522 | Sizaire | Mar. 15, 1921 |
| 1,883,464 | Ball | Oct. 18, 1932 |
| 2,137,323 | Wallach | Nov. 22, 1938 |
| 2,295,750 | Norris et al. | Sept. 15, 1942 |
| 2,551,528 | Darrin | May 1, 1951 |

FOREIGN PATENTS

| Number | Country | Date |
| --- | --- | --- |
| 39,818 | Netherlands | Jan. 15, 1937 |